Jan. 20, 1959     H. B. GAINES     2,869,956
EXTENSION COMMODE
Filed May 13, 1957     6 Sheets-Sheet 1
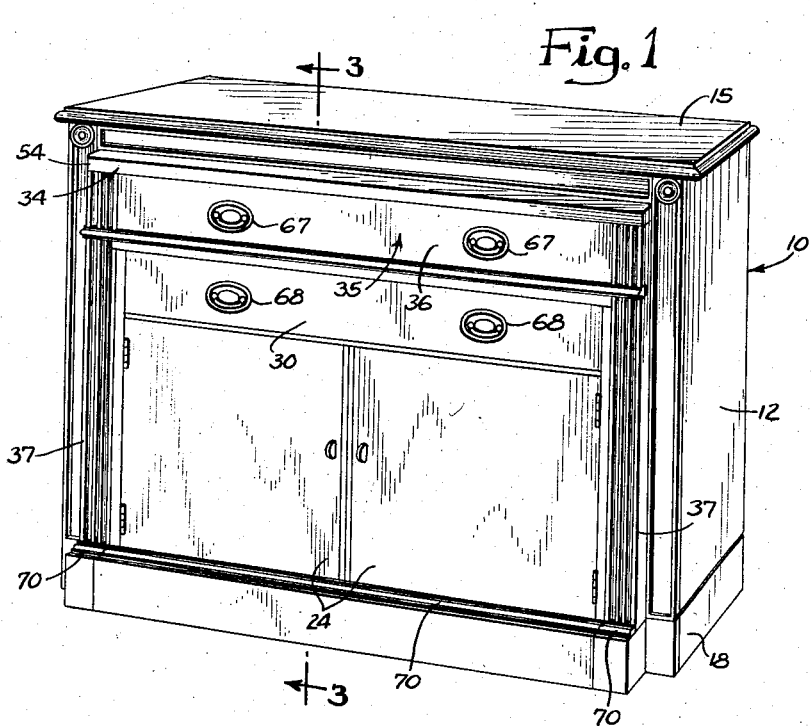
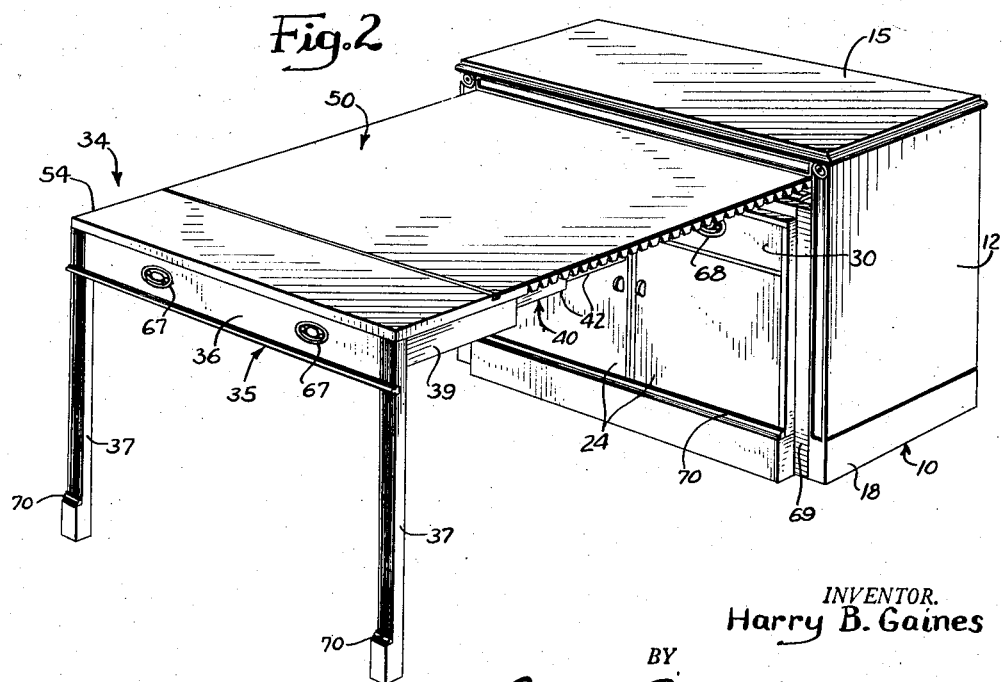
INVENTOR.
Harry B. Gaines
BY Carlson, Pitzner, Hubbard & Wolfe
Attys.

Jan. 20, 1959 H. B. GAINES 2,869,956
EXTENSION COMMODE
Filed May 13, 1957 6 Sheets-Sheet 2
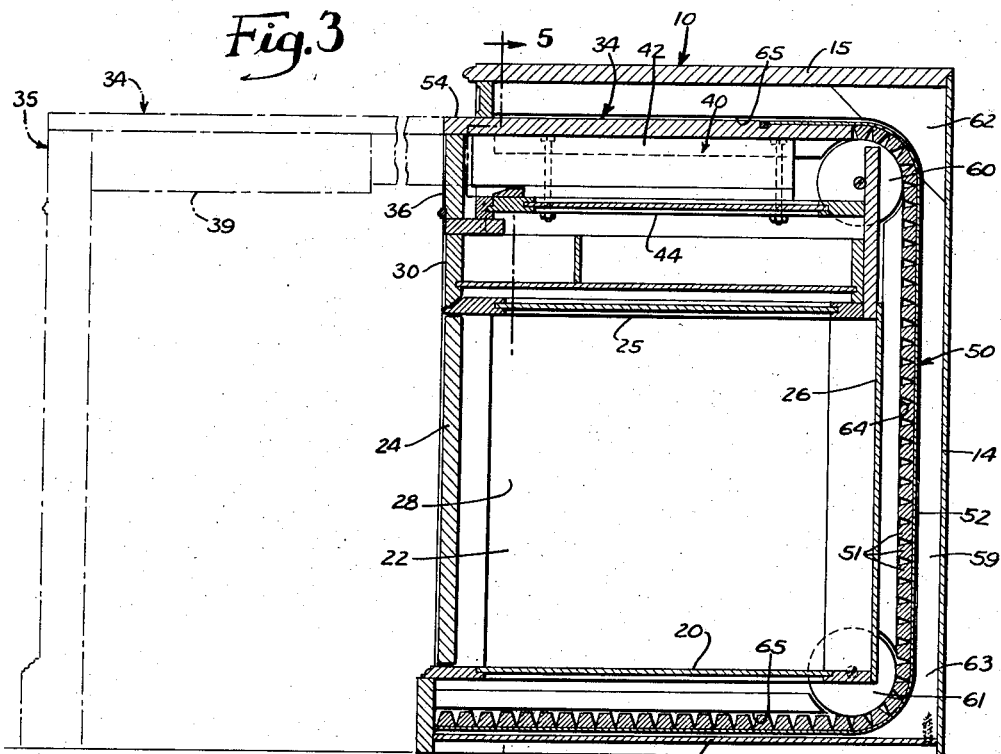
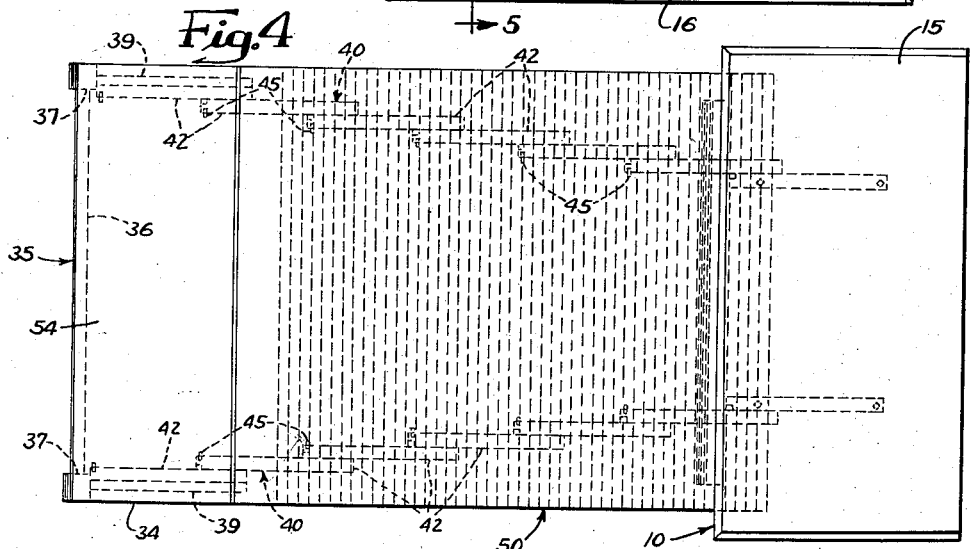
INVENTOR.
Harry B. Gaines
BY
Carlson, Pitzner, Hubbard & Wolfe
Attys.

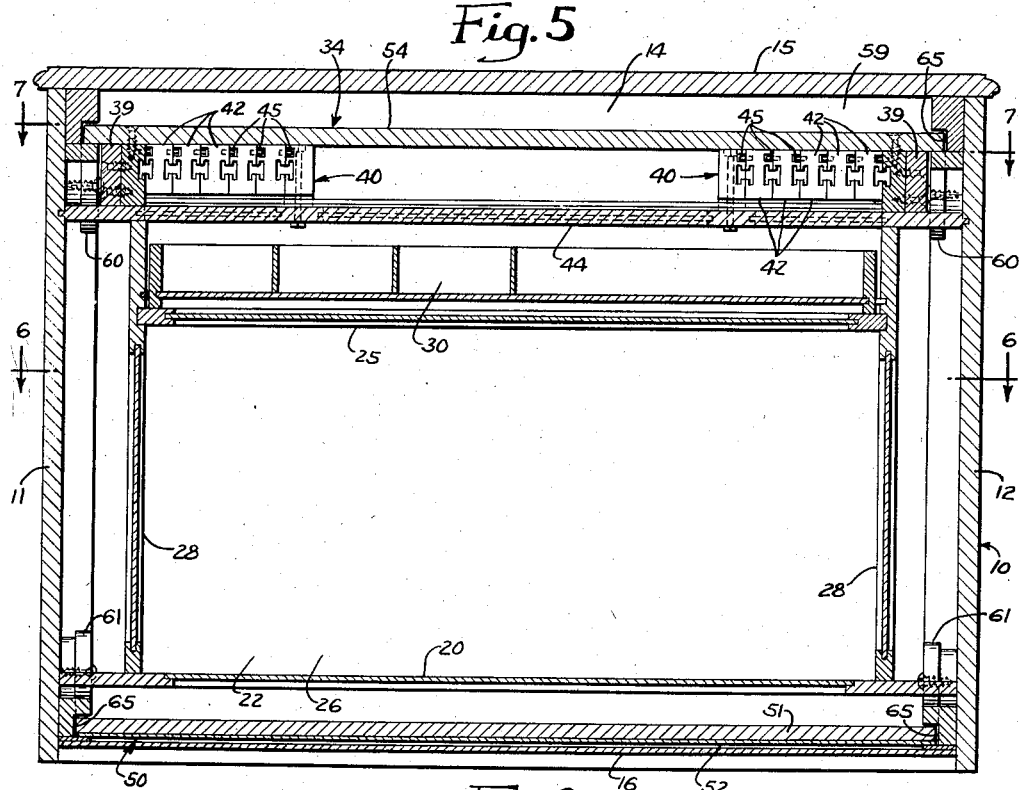
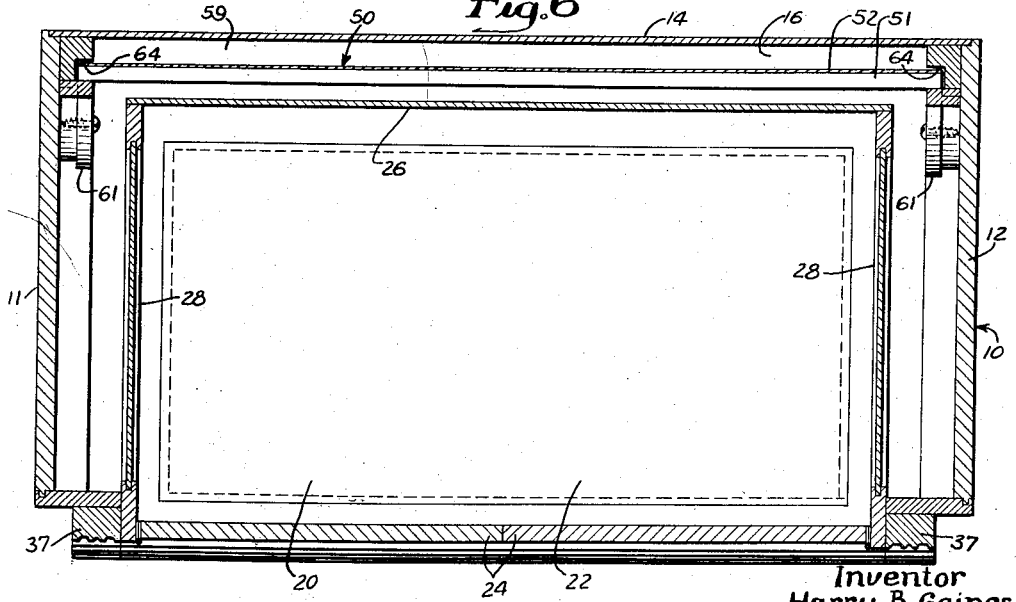

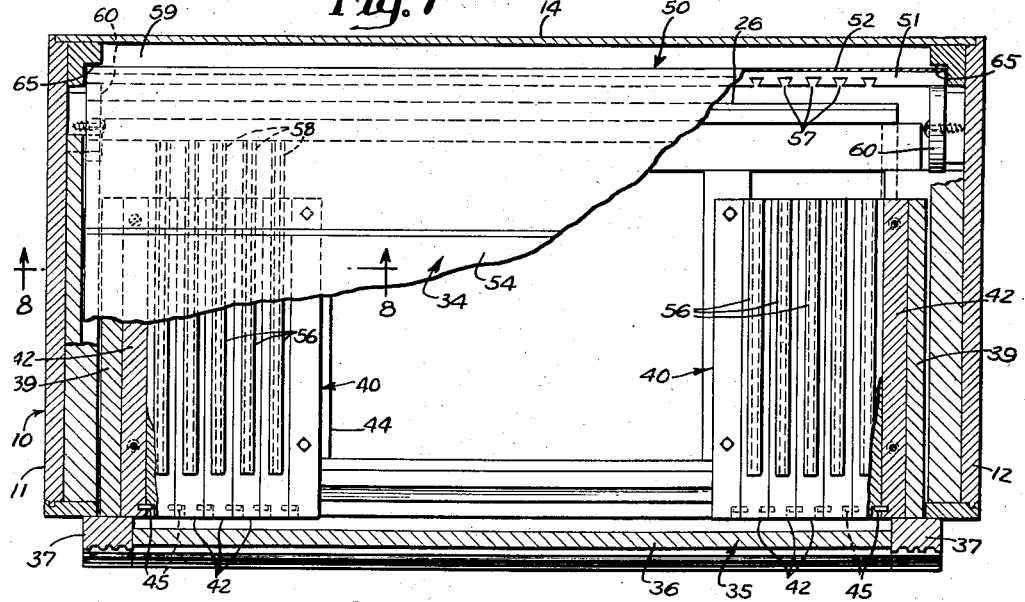
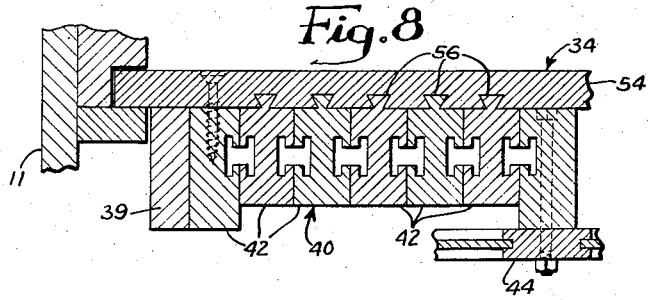
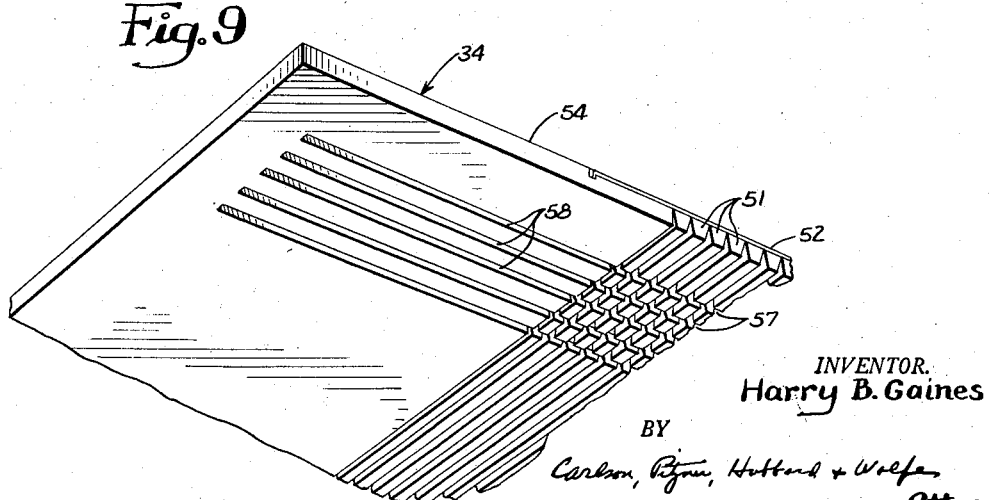

Jan. 20, 1959     H. B. GAINES     2,869,956
EXTENSION COMMODE

Filed May 13, 1957     6 Sheets-Sheet 5

Inventor
Harry B. Gaines
By Carlson, Pitzner, Hubbard &Wolfe
Atty's

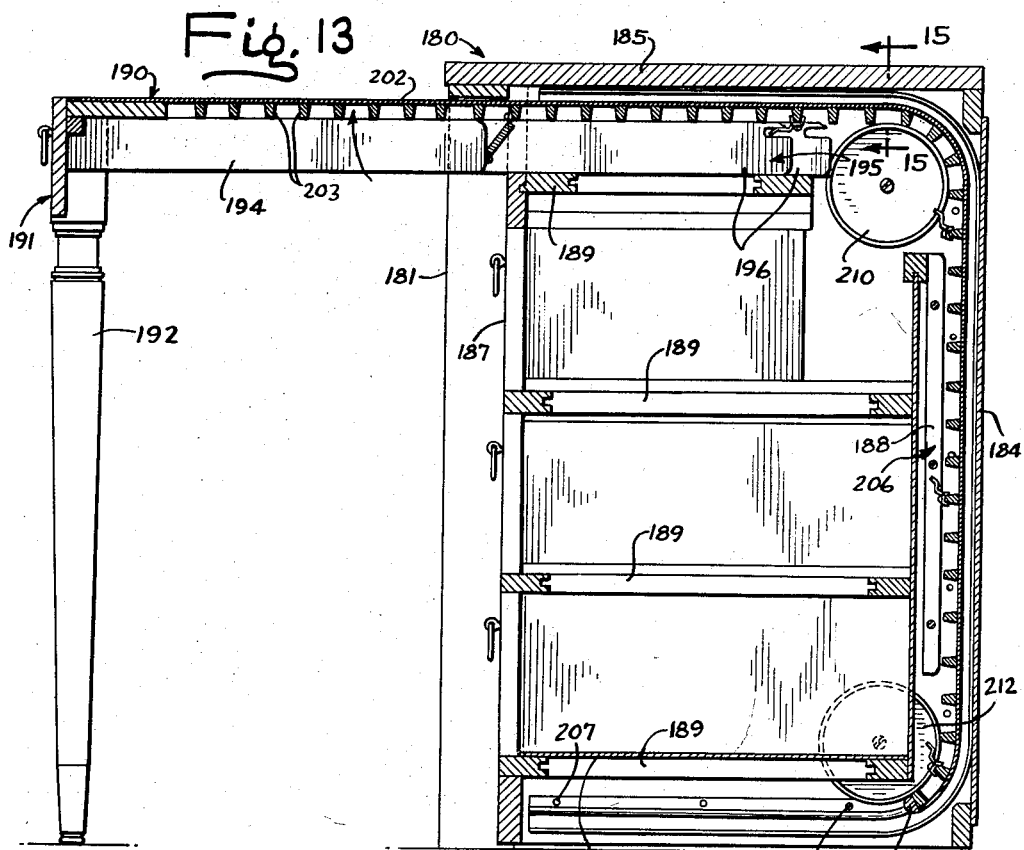
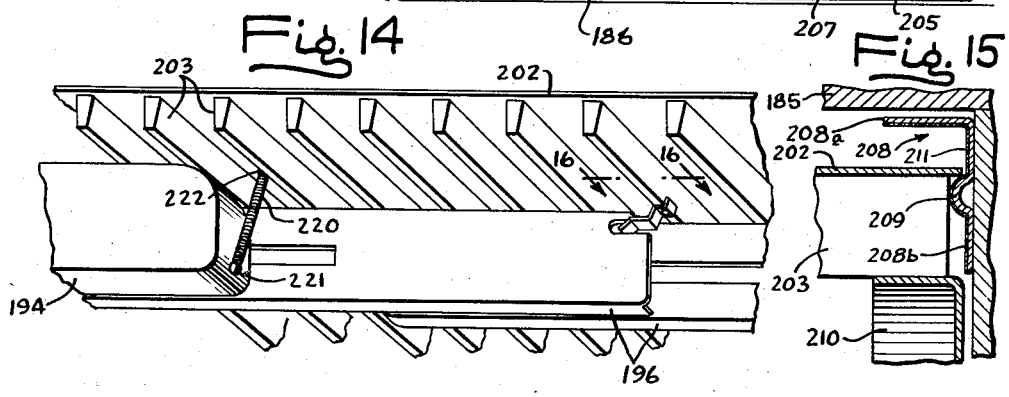
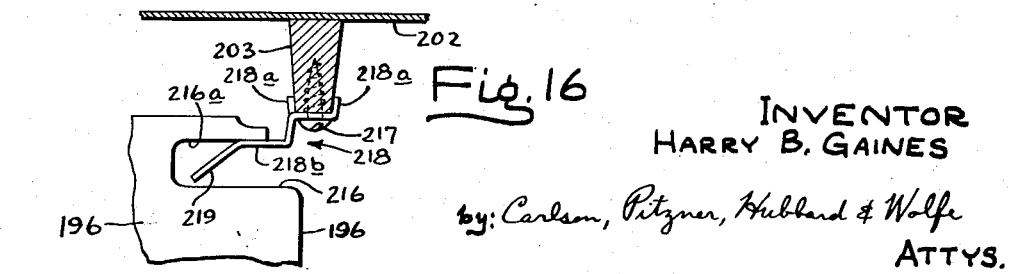

United States Patent Office 2,869,956
Patented Jan. 20, 1959

2,869,956
EXTENSION COMMODE

Harry B. Gaines, Chicago, Ill., assignor to Saginaw Furniture Shops, Inc., Chicago, Ill., a corporation of Michigan Application May 13, 1957, Serial No. 659,202

4 Claims. (Cl. 312—297)

The present invention relates to a new and improved extension commode.

One of the objects of the present invention is to provide an improved extension commode which is readily convertible into an extension table, or into a commode having cabinet and drawer space, with the table retracted indiscernibly into nested or interfitting relation with the commode.

Another object is to provide an extension commode having an extension table which is compactly retractable into the commode so as to leave an unusually large space therein for storage of linen, silver, and the like.

It is a further object to provide an extension commode having an entirely self-contained extension table mechanism, dispensing entirely with loose table leaves.

Another object is to provide an extension commode having an extension table including a roll top which is compactly retractable into the commode. A related object lies in the provision in an extension commode of the foregoing character a construction permitting retraction of the table without binding during the retracting movement.

A further and more specific object is to provide an extension commode having an extension table comprising a slatted roll top provided with an outer support comprising two corner legs, a top cross member between the legs, and rearwardly projecting side members, the aforesaid elements of the outer support being retractable into interfitting relation with the body of the commode to define complementary elements thereof.

A further specific object is to provide an extension commode having an extension table including a plurality of extension slides and a slatted roll top which is constructed and arranged to lie flat and level when extended.

Still another object lies in the construction of the roll top and guide means therefor preventing marring of the top as it is extended and retracted.

A general object is to provide an extension commode, comprising an extension table, which contains all of the parts in compact relationship when the table is retracted, and which is simple in construction and attractive in appearance.

Other objects and advantages of the invention will become apparent as the description proceeds.

The present application is a continuation-in-part of application Serial No. 271,655 filed February 15, 1952, now abandoned, and Serial No. 423,030 filed April 14, 1954, now abandoned.

In the accompanying drawings:

Figure 1 is a perspective view of an extension commode embodying the features of the present invention.

Fig. 2 is another perspective view, with the incorporated table of the commode shown in extended position.

Fig. 3 is a vertical sectional view taken along the line 3—3 of Fig. 1.

Fig. 4 is a plan view of the commode with the table extended.

Fig. 5 is a vertical sectional view taken along the line 5—5 of Fig. 3.

Fig. 6 is a horizontal sectional view taken along line 6—6 of Fig. 5.

Fig. 7 is a horizontal sectional view taken along line 7—7 of Fig. 5.

Fig. 8 is a fragmentary vertical sectional view on an enlarged scale, taken along line 8—8 of Fig. 7.

Fig. 9 is a fragmentary perspective view illustrating the extensible top of the the extension table as viewed from underneath.

Fig. 13 is a vertical section through yet another embodiment of the invention, the section being taken in a location like that of Fig. 3.

Fig. 14 is an enlarged fragmentary perspective view illustrating the extension table shown in Fig. 13 with the table top being in extended position and viewed from underneath.

Fig. 15 is an enlarged fragmentary cross-section taken along the line 15—15 in Fig. 13 and showing the table top guiding means provided within the interior of the cabinet.

Fig. 16 is a vertical section taken through the extensible table top along the line 16—16 in Fig. 14 and showing in detail means for holding the table top against the extensible slide structure.

Figure 10:
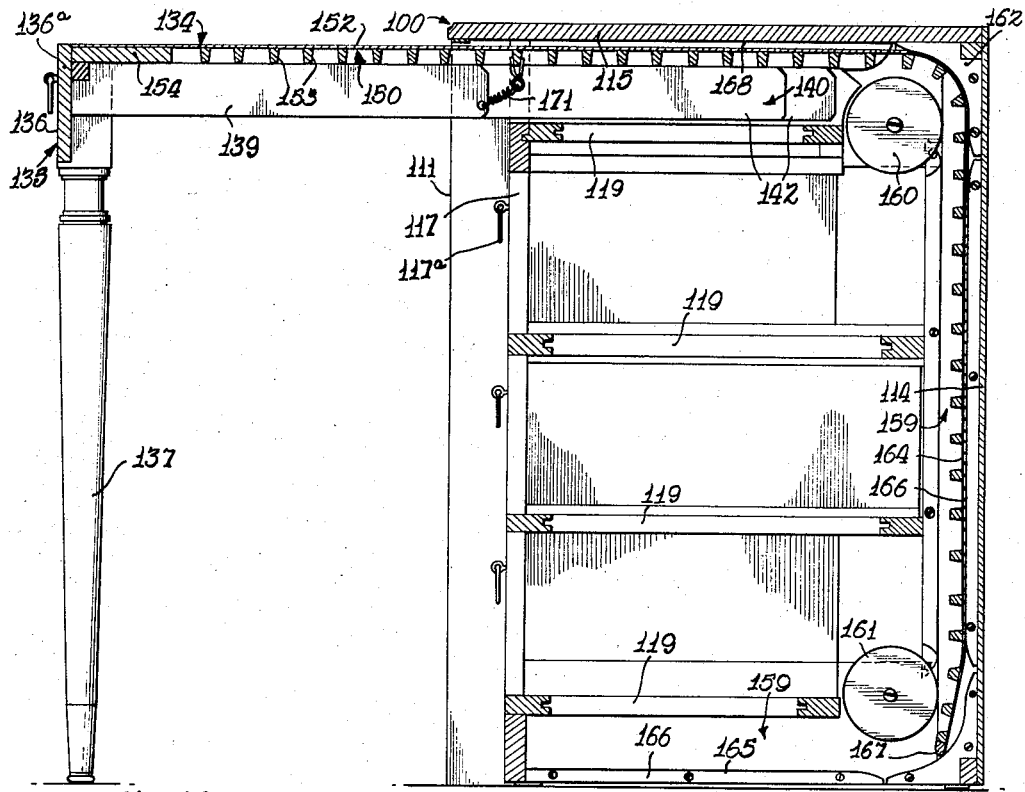
Fig. 10 is a vertical section through another embodiment of the invention, the section being taken in a location like that of Fig. 3.

While the invention is susceptible of various modifications and alternative constructions, there is shown in the drawings and will herein be described in detail certain preferred embodiments, but it is to be understood that it is not thereby intended to limit the invention to the specific forms disclosed, but it is intended to cover all modifications and alternative constructions falling within the spirit and scope of the invention as expressed in the appended claims.

Referring more particularly to the drawings, the commode constituting the first exemplary embodiment of the present invention comprises a hollow chest or cabinet 10 which may be provided in any desired style or design, and which, as shown, has end walls 11 and 12, a rear wall 14, a flat top 15, and a bottom closure 16.

A base section 18 (Fig. 1) of the commode 10 supports a horizontal partition 20 therein, spaced above the bottom closure 16 so as to form the lower wall of an interior cabinet space 22, the latter being closed at the front of the commode by a pair of hinged doors 24. A second horizontal partition 25 forms the upper wall of the cabinet space 22. The upper, rear and side walls of the cabinet space are formed respectively by the horizontal partition 25, a vertical rear partition 26 spaced inwardly from the back 14 of the commode, and a pair of vertical side partitions 28 spaced inwardly from the sides 11 and 12 thereof. A suitable compartmented silver and linen drawer 30 is supported by the horizontal partition 25 and is positioned between the side partitions 28.

Associated with the cabinet 10 is an extension table 34 which may be collapsed or retracted when not required, or extended for use. When the table 34 is retracted, elements thereof are indiscernibly nested within or located in interfitting relation with the cabinet 10 so that the latter has the true exterior appearance of a commode. When the table 34 is extended, the cabinet 10 serves as a pedestal supporting one end thereof.

In general, the extension table 34 comprises an outer end section 35 having a top cross member 36, two corner legs 37, and short rearwardly projecting side end members 39. The outer end section 35 serves as an outboard support for the outer end of the table 34 when the latter is an any extended position.

Suitable telescopic slide structures 40 are anchored at opposite ends respectively to the cabinet 10 and the outer end section 35, and form the intermediate portion of the table 34. More particularly, two parallel table slide structures 40 of like construction are employed, and are adapted to be collapsed into, and enclosed within, the cabinet 10 between the top 15 thereof and the silver drawer 30.

Each slide structure 40 comprises a series of slide bars 42 which are disposed as a series in side-to-side sliding contact, and which are alike in length and of a length such that they can be nested in the cabinet 10. While any desired number of slide bars 42 may be provided, each structure 40 is shown as comprising seven bars, the outermost and innermost bars 42 being rigidly secured respectively to the contiguous side member 39 of the end section 35, and to a skeletal horizontal partition 44 positioned in the cabinet 10 just above the silver drawer 30. Thus the two structures 40 diverge outwardly when the table is extended as shown in Fig. 4.

The slide bars 42 of each structure 40 are suitably splined together for relative longitudinal independent sliding movement. The specific means employed per se forms no part of the present invention and hence is not disclosed in detail. It is believed sufficient to state that the spline means maintains the bars in side-to-side sliding contact, limits the extent of relative sliding movement to insure proper minimum overlap of contiguous ends of the slide bars, and permits each bar when fully extended to pick up and drag the next succeeding bar outwardly. Limit pins 45, mounted adjacent the outer ends of the bars 42, project laterally therefrom so that as each bar is moved inwardly into registry with the contiguous bar it will pick up and drag the latter with it.

In accordance with the invention, the extension table 34 is provided with a flexible roll top 50 adapted to be supported by the slide structures 40 when the table is extended, and to be retracted into the cabinet 10 when the table is collapsed. In this instance, the top 50 includes a flexible table top element 52 made of sheet material such as leather or fabric, and re-enforced with a plurality of cross members or slats 51, glued or otherwise suitably secured to the underside thereof, the slats 51 being tapered downwardly to present a wedge or keystone shaped cross section, so that the top can readily be flexed downwardly. At its front end, the flexible top element 52 is secured to a rigid table top element 54 mounted on the front end section 35 of the extension table 34. In this illustrative form of the invention to hold the top element 52 flat along the upper edges of the slide bars 42, the slats 51 and the rigid table top element 54 are splined thereto, by means of dovetail keys 56 on the upper edges of the slide bars and interfitting dovetail grooves 57 and 58 in the slats 51 and the rigid table top section 54 respectively.

When retracted into the cabinet 10, the top 50 is compactly stored in a C-shaped compartment 59 situated between the outer cabinet walls 14, 15 and 16 and the partitions 26, 20 and 44, respectively. Track means including two pairs of rollers 60 and 61 and adjacent arcuate blocks 62 and 63 carry the top element 52 around the upper and lower corners of the compartment. The edges of the top element 52 are guided by sets of vertical and horizontal tracks or grooves 64 and 65 in the rear and lower portions of the compartment respectively.

When fully retracted, the outer end section 35 of the extension table 34 is adapted to interfit compatibly and harmoniously with the cabinet 10, so as to contribute to the cabinet design. Thus the side members 39 are so spaced that they will enter the cabinet 10 just inside the end walls 11 and 12 thereof. The cross member 36 in retracted position serves to close the front of the cabinet 10 and is vertically flush with the cabinet doors 24 and the front of the silver drawer 30. On its outer surface, the cross member 27 is provided with a design defining a simulated or false drawer with handles 67 which are alined vertically with similar handles 68 on the silver drawer 30.

The legs 37 are movable with snug interfitting relationship into corner recesses 69 in the cabinet 10, and when located therein give the appearance of pilasters. In this complemental assembly, features of ornamental design are correlated. Thus a decorative molding 70 is formed in part on the front wall of the cabinet and in part along the front of the legs 37, the ends of the separated sections thereof being alined when the table is retracted. Moreover, the lower ends of the legs 37 are enlarged so that they will fill out and be consistent with the structural design of the base 13 at the front corners.

The table slides 40 and the top 50, being compactly housed in the cabinet 10, are completely out of sight when the table is retracted, so that the structure has every appearance of being a commode with two drawers and a cabinet.

It will be evident that there is provided an extension commode which is readily convertible to either a commode in semblance or an extended table. To form the table, it is necessary merely to pull out the front end section 35 so as to extend the slides 40 and withdraw the top from the compartment 59. The flexible fabric or leather element 52 of the top presents a smooth unbroken surface which is perfectly suited to every use to which a table is normally put. Adequate reinforcement for the top is provided by the slats 51, which are held firmly in position by the interlocking spline connections with the slide bars 42.

To collapse the table, it is necessary merely to push in the end section 35 until it interfits with the cabinet 10, thereby restoring the commode in semblance. During the collapsing operation the top 50 moves around the rollers 60 and 61 and along the grooves 64 and 65. In the retracted or collapsed condition, the slide structures 40 and the top 50 are completely concealed from view, and the end section 35, with the cross member 36 and the legs 37, fits into and complements the commode design.

Figures 11, 12:
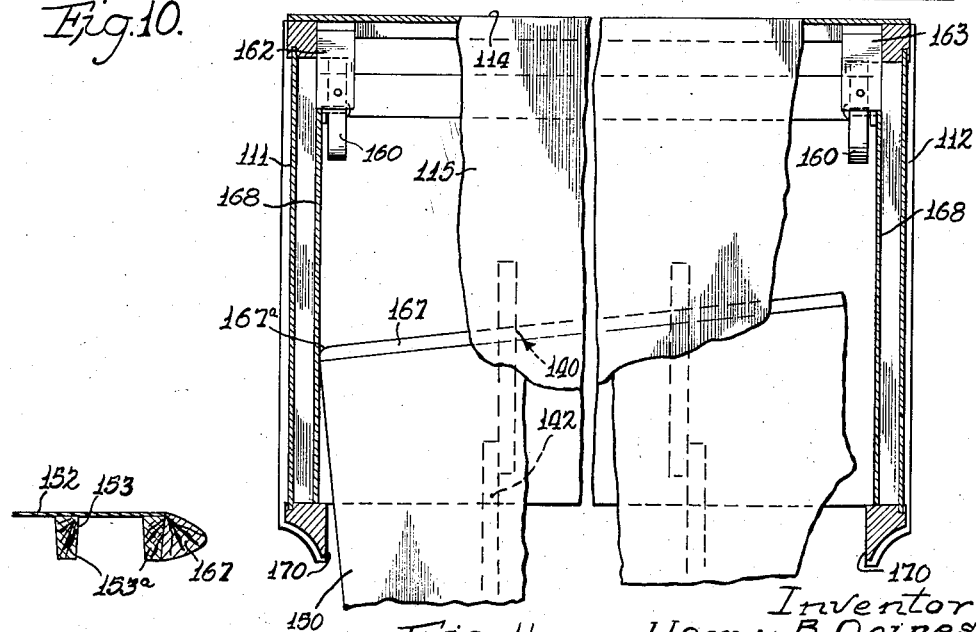
Fig. 11 is a fragmentary plan view partly in section of the embodiment shown in Fig. 10 with portions broken away to show underlying components.
Fig. 12 is an enlarged fragmentary section of the inner edge of the extensible table top component of the embodiment shown in the preceding two figures.

In Figs. 10, 11 and 12 there is illustrated another exemplary embodiment of the present invention. As in the first form shown and described, this form includes a hollow chest or cabinet 100 which may be fashioned according to any desired styling and which has end walls 111 and 112, a rear wall 114, and a flat top wall 115. The cabinet 100 is equipped with drawers 117 to accommodate silver, linen and the like. Thus, the interior of the cabinet is compartmented by the provision of horizontal skeletal partitions 119, the upper surfaces of the lower ones of which serve as supporting slides for the drawers 117.

Associated with the cabinet 100 is an extension table 134 which can be collapsed or retracted into the cabinet when not required, or can be withdrawn from the cabinet and extended as desired for use. As in the first form shown, when the table 134 is retracted the components thereof are indiscernibly nested within or located in interfitting relation with the cabinet 100 so that the true exterior appearance of a commode obtains. Upon extension of the table 134 the cabinet 100 serves as a pedestal supporting one end of the table.

In general, the table 134 includes an outer end section 135 having a top cross member 136, two corner legs 137, and a pair of relatively short rearwardly projecting side members 139. The outer end section 135 serves as an outboard support for the outer end of the table 134 when the latter is in any extended position, A pair of suitable top supporting telescopic slide structures 140 are provided. These are anchored at their opposite ends respectively to the outer end section 135 and to the cabinet 100. Thus, the two parallel slide structures form the intermediate support portion of the table 134 and are adapted to be collapsed into, and enclosed within, the upper portion of the cabinet above the topmost drawer 117.

Each slide structure comprises a side-by-side series of slide bars 142 of which the outermost bar is fastened to the contiguous side member 139 of the table end section 135. The innermost bar of each slide structure is secured within the cabinet 100 to the upper one of the transverse skeletal partitions 119.

The extension table 134 is provided with a flexible roll top 150 arranged to be supported by the slide structures 140 when the table is extended. The top 150 is adapted to be fully enclosed within the cabinet 100 when the table 134 is retracted. In the present instance the top 150 includes a flexible table top element 152 made of sheet material reinforced with a plurality of spaced cross members or slats 153. Preferably the top element 152 is formed of material presenting a hard, smooth, impervious surface yet which, at the same time, is sufficiently flexible to permit bending. Such a material may comprise randomly dispersed glass fibers in a suitable binder, for example. The cross members or slats 153 are rigidly secured to the underside of the top element 152 and may be formed integrally with the top element in a molding operation. Preferably the slats 153 are tapered downwardly so as to present a wedge or keystone-shaped cross section. At its front end the flexible top element 152 is secured to a rigid table top element 154 mounted on the front end section 135 of the extension table 134. By virtue of the character of the material employed for, and the construction and arrangement of, the top elements 152 and 153, the table top 150 normally tends to assume a flat position atop the slide structures 140 as the table is extended.

When retracted into the cabinet 100 the top 150 is compactly stored in a generally C-shaped compartment 159 defined by the cabinet walls 114 and 115 and extending behind the rear ends of the transverse partitions 119 along the back of the cabinet 100, and beneath the lowermost of the partitions 119 along the bottom of the cabinet 100. Track means including two pairs of rollers 160 and 161 and arcuate corner blocks 162 and 163 carry the top 150 around the upper and lower rear corners of the interior compartment 159 of the cabinet. The edges of the top 150 are guided to and from the rollers and corner blocks by sets of vertical and horizontal tracks or grooves 164 and 165 in the rear and lower portions of the C-shaped compartment 159, respectively. The grooves or tracks 164 and 165 are defined by guides 166 here shown in the form of strips suitably secured to the end walls 111 and 112 along the rear and bottom edges thereof. Because of the normal tendency of the top element to assume a flat position, only outwardly located guide strips are needed so as to provide inwardly facing abutting surfaces for the top 150.

In Fig. 12 there is shown in fragmentary section the inner edge portion of the top 150 including the inner terminal edge of the top element 152 and the last two of the series of spaced cross slats 153. To assist in guiding the top 150 into and about the compartment 159 during retracting movement of the table 134, the inner edge of the top 150 is equipped with a nose piece 167. The nose piece is made rigid with the innermost cross slat 153 and is of tapered contour so as to move smoothly along the guide strips 166, the guide blocks 162 and 163 and about the rollers 160 and 161.

As heretofore noted the top 150 normally tends to assume a flat condition and because of this the top presses outwardly against the guide surfaces 164 and 165 provided by the guide strips 166. It is evident that abutment of the side edges of the top 150 with the guides prevents outward movement thereof, and there is present a tendency for the portion of the top intermediate its side edges to bow outwardly as it passes about the rollers 160 and 161. The top 150 is, therefore, formed to resist this outward bowing and the cabinet 100 is free of any intermediate parts which might be engaged by the central portion of the top during movement thereof into and out of the compartment 159. Thus danger of marring the top surface of the element 152 is eliminated. More particularly the cross slats 153 of the top 150, which are preferably formed of wood, are so fashioned as to have the so-called "grain plane" thereof disposed substantially at an angle to the plane of the top element 152 so as to be substantially out of parallelism thereto. This disposition of the grain as indicated at 153a in Fig. 12 tends to resist bowing. Further, the nose piece 167 is so formed and secured in place that it is in cross-grain relation to the slats 153. It will be apparent that tendency to bow along the innermost edge of the top is thus minimized both by the presence of additional material of the nose piece 167 and by the cross-graining arrangement thereof with respect to that of the innermost one of the cross slats 153.

It will be appreciated that considerable clearance between relatively movable parts is conventionally incorporated in pieces of furniture. The main reason for this is that wood tends to be hygroscopic and the allowance of clearance prevents binding should the wood swell with an increase in humidity for example. The clearance between the table top 134 and the side wall structures 111 and 112 of the cabinet 100 permits some relative lateral movement of the table with respect to the cabinet. To prevent jamming of the top 150 with the side walls 111 and 112 during retraction of the table 134 if the table should become slightly misaligned with the cabinet, each of the side wall structures is provided with a side guide strip 168 adapted for engagement by the rounded inner rear corners 167a of the nose piece 167. Thus, as the nose piece on the innermost edge of the table top 150 moves therealong it is so guided that the top 150 is gradually drawn into alinement with the cabinet 100, and any binding therebetween is prevented.

When fully retracted the outer end section 135 of the extension table 134 interfits compatibly and harmoniously with the cabinet 100 and thus contributes to the over-all cabinet design. Contributing to this feature, the side members 139 of the outer end section 135 are so spaced that they enter the cabinet just inside the end wall structures 111 and 112 thereof, and the cross member 136 in retracted position serves to close the upper front portion of the cabinet. So too, the legs 137 are movable into interfitting relationship into corner recesses 170 in the cabinet 100 as defined by the front portions of the end wall structures 111 and 112 which are arranged to project forwardly of the plane of the drawer fronts. Thus the legs give the appearance of pilasters when received in the corner recesses. To facilitate opening and closing movement of the table the cross member 136 is provided with handles 136a corresponding to the handles 117A provided on the drawers 117.

The table slides 140 and the top 150 being compactly housed within the compartment 159 in the cabinet 100 are completely out of sight when the table is retracted so that the structure presents the appearance of being a commode with four drawers.

To form the table it is necessary merely to pull out the front section 135 so as to extend the slides 140 and withdraw the top 150 from the compartment 159. The top element 152 presents a smooth unbroken surface which is perfectly suited to every use to which a table is normally put, and even though the top element 152 is sufficiently flexible so as to permit bending, the slats 153 provide adequate reinforcement thereof when resting on the slide structures 140. In order to insure maintenance of the slats in engagement with the slide structures 140 a spring 171 may be provided between one of the slats 153 and the slide structures 140. The spring serves to draw the slats 153, and thus the top 150, into intimate engagement with the slide structures 140. It is desirable that the point of attachment of the spring to the top 150 be located in such a position that it is close to that portion of the top that traverses the rollers 160. It is this portion of the top that conceivably might assume a condition other than flat because of maintenance for prolonged periods of the top in a bent condition about the rollers 160 when the table 134 is withdrawn into the cabinet. Further, this positioning of the spring places it at the rearmost portion of the side members 139 of the table 134 so that the point of attachment is spaced well apart from the attached forward edge of the top 150 with the outer end section 135 and at the same time prevents interference with operation of the slide structures 140.

To collapse the table 134 it is necessary merely to push in the end section 135 until it interfits with the cabinet 100, thereby restoring the commode in semblance. During the collapsing operation the inner rear corners 167a of the nose piece 167 guide along the side guides 168 alining the table 134 with the cabinet 100, and the top moves around the rollers 160 and 161 and along the grooves or tracks 164 and 165. In the retracted or collapsed condition the slide structures 140 and the top 150 are completely concealed from view, and the end section 135, with its cross member 136 and legs 137, fits into and complements the commode design.

There is illustrated yet another embodiment of the invention in Figs. 13-16, inclusive. The overall structure of the cabinet and table top shown in this embodiment is very similar to that shown and described above in connection with Figs. 10, 11 and 12. Thus, there is shown in Fig. 13 a hollow chest or cabinet 180 having a pair of vertical end walls 181 (only one shown), a vertical rear wall 184, a horizontal and flat top wall 185, and a horizontal bottom wall 186. The cabinet 180 is equipped with drawers 187 to accommodate silver, linen, and the like, and the interior of the cabinet is formed into horizontal compartments by vertically spaced skeletal partitions 189, the upper surfaces of which can serve as supporting slides for the drawers 187. Guide strips 188 in the form of strips are suitably secured to the end walls 181 along the rear edges thereof.

Adapted to be retracted into or withdrawn from the cabinet is an extension table 190, the table including an outer end section 191, two corner legs 192, and a pair of relatively short, rearwardly-projecting side members 194.

For carrying the table top between extended and retracted positions a pair of suitable top supporting telescopic slide structures 195 are provided, these being arranged near the respective end walls 181 of the cabinet. Each slide structure 195 comprises a side-by-side series of slide bars 196 of which the outermost bar is fastened to the contiguous side member 194 of the table end section 191. The innermost bar of each slide structure 195 is secured within the cabinet 180 to the upper one of the transverse skeletal partitions 189.

A transversely flexible top 200, of the same construction as that shown in Figs. 9-12, is arranged to be supported by the slide structures 195 when the table is extended. The top 200 includes a flexible top element 202 made of sheet material reinforced with a plurality of laterally spaced slats 203. This top element 202 is formed of material which is susceptible to bending and yet which at the same time presents a hard, smooth, impervious surface having many desirable properties enchancing its use as a table top.

The details of construction of the table top 200 need not be repeated here; suffice it to say that one end of the flexible top element 202 is secured to the front end section 191 and the other or inner end of the top element has secured thereto a horizontally disposed nose piece 205, which nose piece assists in guiding the top 200 into and around the interior of the cabinet 180. As in the embodiment shown in Figs. 9-12, the nose piece 205 is made rigid with the innermost slat 203 and is of tapered and rounded contour so as to move smoothly along the interior of the cabinet.

When retracted into the cabinet 180 the top 200 is compactly stored in a generally C-shaped compartment 206 defined by the cabinet walls 184, 185 and 186 and extending behind the rear ends of the transverse partitions 189 along the back of the cabinet 180, and beneath the lowermost one of the partitions 189 along the bottom of the cabinet.

In carrying out this aspect of the invention means is provided within the C-shaped compartment 206 for guiding the table top 200 smoothly as it is extended or retraced with respect to the cabinet 180 and around the upper and lower rear corners of the interior compartment 206 to prevent the top's binding against any interior surfaces. The guide means in this instance comprises a pair of tracks 208 of L-shaped cross-section which are rigidly secured within the cabinet along the interior of the end walls 181, and two pairs of rollers 210, 212 which carry the top 200 around the upper and lower rear corners of the C-shaped compartment 206.

Attention is directed to the details of construction of the guide tracks 208. Upon reference to Fig. 15, it will be seen that each of the tracks 208 traverses the entire C-shaped compartment 206 and has a generally L-shaped cross-section, with one leg 208a of the L being disposed adjacent to the top, rear, and lower panels 185, 184 and 186, respectively, of the cabinet 180, and the other leg 208b secured to the inner surfaces of the cabinet end walls 181 as by suitable screws 207. The track 208 is smoothly curved around the interior upper and lower rear corners of the cabinet 180 and the track together with the corner rollers 210, 212 is so positioned with respect to the curved corners as to direct passage of the table top 200 therebetween. When the table top 200 is in place, the leg 208a of the track occupies a position substantially parallel with the plane of the top, while the track leg 208b is normal to the top and passes somewhat outside of the side edges thereof.

For receiving in sliding engagement the side edges of the table top 200, the leg 208b of the illustrative track is provided over its entire length with an inwardly projecting bead 209. As shown in detail in Fig. 15, the bead 209 is arranged about midway of the width of the leg 208b having a rounded and, in this instance, semi-circular contour such that it furnishes a supporting shoulder for the edge of the top 200. It will be noted that the bead 209 extends inwardly toward the table top a sufficient distance so as to engage and thereby guide the ends of the top slats 203. Yet the contour of the bead 209 also is such as to provide lateral clearance as between the track leg 208b and the side edge of the top member 202, which edge extends slightly beyond the ends of the slats 203. That is the width w of the bead 209 is greater than the slight overhang of the edge of the top member 202 beyond the slat ends. In this way there is virtually no drag encountered in the sliding motion of the table top 200 along the track 208. The spacing between the rollers 210, 212 and the tracks 208 is such that the side edge of the flexible top member 202 rides easily and with lateral clearance along the track bead 209. And guiding engagement is accomplished between the track bead 209 and the ends of the slats 203 over a limited area of contact due to the round and flat contour of the bead and slat ends, respectively. It should be noted also that the bead 209 performs a dual function in that it also serves to strengthen the track 208 against bending.

For facilitating sliding engagement as between the side edges of the table top 200 and the track 208, the inner surfaces of the track legs 208, the inner surfaces of the track legs 208a and 208b have been coated with a material possessing a low coefficient of sliding friction as compared with the usual wood and metal surfaces used in sliding engagement in furniture pieces. In this instance the material chosen is that known to the industry as "Teflon," which comprises a tetrafluoroethylene resin, although other suitable materials having similar properties may be employed with equally good results. The coating 211 obviates any need for lubrication between the sliding surfaces and thus assures smooth and noise-free movement of the table into and out of the cabinet 180.

It will be observed from Fig. 15 that sufficient space (several times the thickness of the top element 202) is provided between the bead 209 and the track leg 208a to accommodate such slight buckling movement of the table top 200 as is unavoidable attendant to movement of the top between retracted and extended positions. Yet the smooth coating 211 of "Teflon" on the inner surfaces of the track 208 and the confined nature of the space between the bead 209 and the track leg 208a assure unhindered movement of the table top 200 into and out of the compartment 206 and thus additionally prevent marring of the top surface.

In practice it has been found that where long periods of storage of the table within the commode cabinet are necessary, there is sometimes encountered a tendency on the part of the table top 200 to buckle slightly. And on occasion even during frequent use of the table top 200, there is observed a tendency for the top to assume a slightly undulating rather than almost absolutely flat condition when the top has been extended. It is to be noted in this connection that the illustrative table top 200, comprised as it is of a thin flexible top element 202 and spaced wooden supporting slats 203, is light in weight compared to conventional solid wooden table tops of appreciable thickness. In addition the construction of the illustrative device allows some freedom of motion of the top 200, especially in an up-and-down direction when the table is in extended condition.

Accordingly, means is provided for assuring a flat and unbuckled condition of the table top 200 when the top is extended from the cabinet 180. From the drawings it will be seen that each of the slide bars 196 of the slide structures 195 is provided at its inner or rear end with a horizontal slot 216. The slots 216 are relatively short compared with the length of the bars 196 and are positioned just below the tops of the bars. For engaging respective ones of the slots 216 a plurality of specially formed holding members 218 are provided. The members 218 are affixed to appropriate ones of the top slats 203 spaced at intervals over the extensible length of the top. The spacing intervals between successive holding members 218 are pre-set to conform to the length of the slide bars 196 such that, upon outward movement of the top, the members 218 successively engage the slots 216 simultaneously with withdrawal of the slide bars 196 outwardly from the cabinet 180 under the telescoping action of the slide structure 195. Of course the holding members 218 are also spaced laterally from one another, as well as inwardly from the corner rollers 210, 212, in order that they be properly alined with the respective slide bars 196 which are disposed in side-by-side relationship.

Attention is drawn to the special shape of the holding members 218, which are economically formed as sheet metal cut-outs. It will be observed that these members 218 are generally flat and elongated and have an upturned channel portion 218a at one end for fitting over the lower tapered ends of the slats 203 to which they are affixed by means of suitable wood screws 217. Each is also provided with a hook portion 218b for engaging the upper and inner surfaces 216a of the slide bar slots 216. When the table top 200 is in extended condition the hook portion 218b of the holding member 218 is disposed generally horizontally and has an outer surface 219 which is slightly downwardly inclined.

The inclined surface 219 of the holding member 218 serves a dual function. First, this surface acts as a probe in "finding" the slot 216 to facilitate initial engagement between the member 218 and the slot. Second, the inclined surface 219 functions as a cam during engagement of the slot 216 by the holding member 218 such that the upper and inner slot surface 216a tends to ride up the inclined holding member surface 219 until a firm lock is achieved as between the horizontal holding member portion 218b and the slot surface 216a. The cam action thus draws the top slats 203 against the slide bars 196 so that these elements are held firmly together when the top is extended. The result is a flat unrolling table top surface which is held firmly in place.

Operation of the illustrative table top locking means is as follows. Starting with the table top 200 in a retracted condition within the cabinet 180, there is of course no relative side-by-side motion as between the slide bars 196. There remains no such motion until the side members 194 of the front end section 191 of the table have been withdrawn their full length from the cabinet interior. It will be observed that there is never any relative sliding motion between the side members 194 and the adjacent overlying portion of the top 200. Accordingly a permanent type hold-down connection is provided between the rear end of each side member 194 and a proximate slat 203 on the underside of the table top. Here this connection (Fig. 14) comprises a helical tension spring 220 secured at 221 to the rear end of the side member 194 and is fixed at 222 to what is in this case the tenth slat 203 from the outermost end of the table top.

When the top 200 has been withdrawn to the position shown in Fig. 13, the slide structure 195 begins to function. First the slide bars 196 adjacent the side members 194 are caught at their outer ends by means of pins (not shown) carried by the inner ends of the side members. Then successive ones of the side-by-side slide bars 196 coact in the same manner as the table top is extended to its outward limit. In this way a continuous and telescoping support structure 195 is provided for the flexible table top 200.

At the same time the respective spaced holding members 218 successively engage the slide bar slots 216 as the top 200 moves outwardly from the cabinet. After initial engagement between the members 218 and the slots 216, the top 200 remains securely fastened to the slide structure 195, with the slats 203 firmly held against the slide bars 196. This "locked-down" condition of the top prevails until the top has been retracted and the holding members 218, in reverse operation to that described above, disengaged from the slots 216.

I claim as my invention:

1. An extension commode comprising, in combination, a cabinet including opposed end walls and a front wall having an opening therein, a front table support including a pair of legs and a cross member connected between the legs adapted to close the opening in the front wall, and including a pair of rearwardly projecting horizontal side members adapted to enter said opening upon movement of the table support into closed position with respect to the cabinet, two extensible and retractable slide structures interposed between said side members and the cabinet, a bendable table top secured at its outer end to the front table support, said top including a bendable top surface element normally tending to assume a flat condition and a plurality of spaced transverse slats rigid with the under side of said surface element, the sides of said bendable top surface element extending slightly beyond the ends of said transverse slats, a generally C-shaped compartment in the interior of said cabinet and passing around the upper and lower rear interior corners thereof for receiving said bendable table top when the top is in a retracted condition, and means including a pair of C-shaped tracks secured adjacent the end walls of said cabinet and within said C-shaped compartment for smoothly guiding said bendable table top therearound, each of said tracks having first and second legs formed to give an L-shaped cross-section and being arranged within said compartment such that said first leg is spaced from and substantially parallel to the plane of said bendable table top and said second leg is normal to said plane and extends adjacent to and beyond the side edge of said table top, said second leg having an inwardly extending semi-circular bead formed therein for engagement by the ends of said table top slats for guiding the sides of said bendable table top into and out of said cabinet, said semi-circular bead having a width extending inwardly toward said table top a distance greater than the over-extension of said top surface element beyond the ends of said slats to prevent drag of the sides of said table top as the top is moved between extended and retracted positions.

2. An extension commode comprising, in combination, a cabinet including opposed end walls and a front wall having an opening therein, a front table support including a pair of legs and a cross member connected between the legs adapted to close the opening in the front wall, and including a pair of rearwardly projecting horizontal side members adapted to enter said opening upon movement of the table support into closed position with respect to the cabinet, two extensible and retractable slide structures interposed between said side members and the cabinet, said slide structures including a plurality of interconnected slide bars disposed in side-by-side relationship, a bendable table top secured at its outer end to the front table support, said top including a bendable top surface element normally tending to assume a flat condition and a plurality of spaced transverse slats rigid with the under side of said surface element, a generally C-shaped compartment in the interior of said cabinet and passing around the upper and lower rear interior corners thereof for receiving said bendable table top when the top is in a retracted condition, guide means within said compartment for assuring smooth movement of said bendable table top into and out of said cabinet interior, and means for positively holding said bendable table top in a flat condition against said extensible and retractable slide structures when the top is in extended condition, said holding means comprising interengageable elements on said slide bars and on spaced ones of said transverse top slats which elements are successively engageable as the table top moves from the retracted into the extended position.

3. An extension commode comprising, in combination, a cabinet including opposed end walls and a front wall having an opening therein, a front table support including a pair of legs and a cross member connected between the legs adapted to close the opening in the front wall, and including a pair of rearwardly projecting horizontal side members adapted to enter said opening upon movement of the table support into closed position with respect to the cabinet, two extensible and retractable slide structures interposed between said side members and the cabinet, said slide structures including a plurality of interconnected slide bars disposed in side-by-side relationship, a bendable table top secured at its outer end to the front table support, said top including a bendable top surface element normally tending to assume a flat condition and a plurality of spaced transverse slats rigid with the under side of said surface element, a generally C-shaped compartment in the interior of said cabinet and passing around the upper and lower rear interior corners thereof for receiving said bendable table top when the top is in a retracted condition, guide means within said compartment for assuring smooth movement of said bendable table top into and out of said cabinet interior, and means for positively holding said bendable table top in a flat condition against said extensible and retractable slide structures when the top is in extended condition, said holding means comprising a plurality of holding members secured in longitudinally spaced relationship along the underside of said table top and slots provided at the inner ends of each of said slide bars for successively receiving the holding members as the table top moves to the extended position.

4. An extension commode comprising, in combination, a cabinet including opposed end walls and a front wall having an opening therein, a front table support including a pair of legs and a cross member connected between the legs adapted to close the opening in the front wall, and including a pair of rearwardly projecting horizontal side members adapted to enter said opening upon movement of the table support into closed position with respect to the cabinet, two extensible and retractable slide structures interposed between said side members and the cabinet, said slide structures including a plurality of interconnected slide bars disposed in side-by-side relationship, a bendable table top secured at its outer end to the front table support, said top including a bendable top surface element normally tending to assume a flat condition and a plurality of spaced transverse slats rigid with the under side of said surface element, a generally C-shaped compartment in the interior of said cabinet and passing around the upper and lower rear interior corners thereof for receiving said bendable table top when the top is in a retracted condition, guide means within said compartment for assuring smooth movement of said bendable table top into and out of said cabinet interior, and means for positively holding said bendable table top in a flat condition against said extensible and retractable slide structures when the top is in extended condition, said holding means comprising a plurality of holding members secured in longitudinally spaced relationship along the under side of said table top and slots provided at the inner ends of each of said slide bars for successively receiving the holding members as the table top moves to the extended position, each of said holding members including a cam portion at its outer extremity adapted to engage the open inner end of a respective one of said slots for assuring initial engagement with said one of said slots and for urging said table top firmly against the slide structures after such initial engagement.

References Cited in the file of this patent

UNITED STATES PATENTS

| 414,968 | Billings | Nov. 12, 1889 |
| 542,139 | Brodin | July 2, 1895 |
| 574,759 | Pickett | Jan. 5, 1897 |

FOREIGN PATENTS

| 725,146 | France | Feb. 6, 1932 |